March 18, 1958 S. SCHNEIDER 2,827,574
MULTIVIBRATORS
Filed Aug. 24, 1953
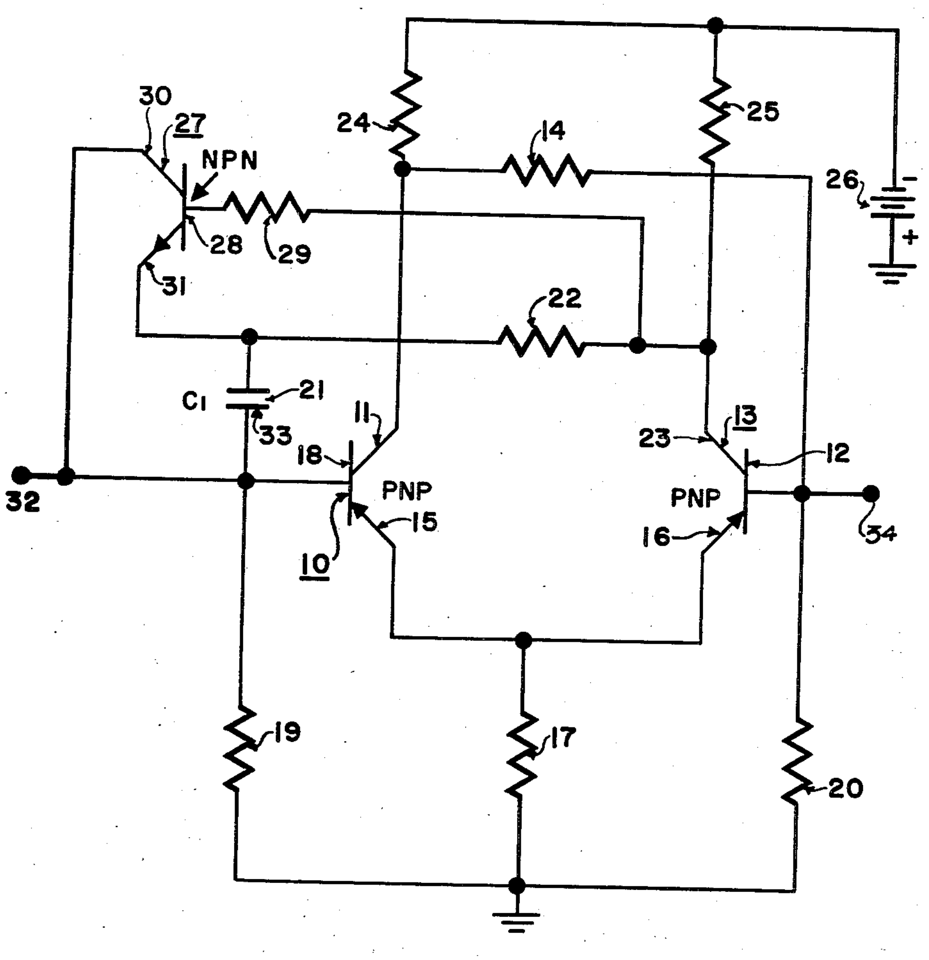
SEYMOUR SCHNEIDER
INVENTOR.
BY [signature]
HIS ATTORNEY United States Patent Office 2,827,574

Patented Mar. 18, 1958

2,827,574

MULTIVIBRATORS

Seymour Schneider, Los Angeles, Calif., assignor to Hoffman Electronics Corporation, a corporation of California Application August 24, 1953, Serial No. 376,205

4 Claims. (Cl. 307—88.5)

This invention relates to improvements in multivibrator circuits and more particularly to a multivibrator circuit which is particularly adapted to control external circuitry such as teletypewriters in response to control information.

In teletypewriting equipment it is common to provide for actuation of the apparatus during the space portion of the transmitted information and to utilize the mark portion of the information to stop the motion of the teleprinter. In the past it has been customary to utilize an RC network type of control circuit which responded to the D. C. level of the incoming signals. Such a control circuit has proved somewhat unstable at low signal levels and under conditions of mistuning of the receiver preceding the teletypewriter. Further, where action of the teletypewriter is initiated by "space" information the apparatus continues to run after signals disappear.

It is an object, therefore, to provide an improved teletypewriter actuating circuit.

It is a further object of this invention to provide a teletypewriter control circuit which is stable and reliable under low signal level conditions.

It is a further object to provide a control circuit for a teletypewriter which is reliable under conditions of mistunning of the receiver preceding the teletypewriter.

It is a still further object to provide a teletypewriter control circuit which consumes a minimum of power, is reliable and has long operating life.

It is an additional object of this invention to provide a multivibrator circuit which is mono-stable in the absence of input signals and bi-stable in the presence of such signals.

According to this invention there is provided a short time bistable multivibrator which is monostable in the absence of input control signals for a predetermined time. The circuit includes a pair of transistors in a conventional multivibrator circuit and a transistor of complementary type shunting the time constant condenser in the monostable multivibrator circuit. This shunting of the time constant condenser by the transistor of a complementary type provides for rapid discharge of that condenser in the presence of incoming control signals. For purposes of clarification of this description, an NPN transistor is considered of a "complementary type" to the PNP transistor, and vice versa.

The features of the present invention which are believed to be novel are set forth with particularity in the appended claims. The present invention itself, both as to its organization and manner of operation, together with further objects and advantages thereof, may best be understood by reference to the following description, taken in connection with the accompanying drawings, in which the sole figure is a schematic diagram of the improved multivibrator control circuit according to my invention.

In the sole figure, transistor 10 has its collector electrode 11 connected to the base or control electrode 12 of transistor 13 through resistor 14. Emitters 15 and 16 of transistors 10 and 13 respectively, are connected together and through biasing resistor 17 to ground or reference potential. Base electrode 18 is connected through resistor 19 to ground and base electrode 12 is connected through resistor 20 to ground. Base electrode 18 is also connected through condenser 21 and resistor 22 to collector electrode 23 of transistor 13. Collector electrodes 11 and 23 of transistors 10 and 13 respectively, are coupled through load resistors 24 and 25, respectively, to a source of operating voltage 26 having the polarity shown when transistors 10 and 13 are chosen to be of the PNP type. Transistor 27, which is of the NPN type, has its base electrode 28 connected through resistor 29 to collector electrode 23 of transistor 13. Collector electrode 30 of transistor 27 is connected to base electrode 18 of transistor 10 and, is connected to one side of condenser 21. Emitter 31 of transistor 27 is connected to the side of condenser 21 opposite to that to which collector electrode 30 is connected. Thus, collector and emitter electrodes 30 and 31, respectively, shunt condenser 21.

The operation of the circuit is as follows:

Assuming the control pulses representing different information have the same polarity, separate points must be provided for the application of each type of pulse, thus in teletypewriter circuits where space pulses and mark pulses are utilized to control the teleprinter, the space pulses may be applied to input terminal 32 and mark pulses may be applied to input terminal 34.

Assume also, that at the outset, transistor 10 is in the cut-off condition and transistor 13 is in the conductive condition, which, as will be shown, is the stable state of this multivibrator circuit to which it returns when there has been a long time elapsed since the last control impulse has been received. Now assume that an impulse having negative polarity and representing a "space" is impressed between input terminal 32 and ground. The characteristic of PNP type of transistors is, as is well known, that they are conductive when the base is negative with respect to the emitter. Therefore, upon the arrival of a negative impulse of sufficient amplitude, transistor 10 will be driven to conduction, which will result in a sudden increase in the flow of current through resistor 24 with a resulting positive impulse on base 12 of transistor 13 and that transistor will be forced to a condition of current cut-off causing the voltage at the collector electrode to rise abruptly. This will result in an increased negative potential being applied to condenser 21 through resistor 22 and that condenser will charge with plate 33 assuming a positive potential towards the potential of the source 26. As condenser 21 approaches its fully charged condition the current passing through it decreases. The potential on base 18 approaches the voltage drop across resistor 17 and transistor 10 cuts off which automatically switches transistor 13 to a conductive condition. Because of the existence of condenser 21 in the collector current path for transistor 10, and the purely resistive nature of the path of collector current for transistor 13, the latter transistor will be normally conductive, and the former cut off, where control pulses are not received for more than a minimum period.

Where transistor 13 is conducting and condenser 21 is effectively biasing transistor 10 to cut-off, the amplitude of control signals on input terminal 32 must be materially increased to overcome such bias and effect a switch of the multivibrator. This condition continues in diminishing degree until condenser 21 is discharged. To eliminate this loss of sensitivity over the period required to discharge condenser 21 through resistors 22 and 19, transistor 27, which is of the NPN type, is inserted in the circuit with its collector and emitter shunting condenser 21 and its base connected to the collector of transistor 13.

As can be seen from the circuit diagram, during the period when transistor 13 is conducting, base 28 of transistor 27 is substantially at ground potential because of the small resistance of transistor 13 in its conductive state and in addition because of the small value of bias resistor 17. Its emitter, however, has a negative potential applied to it from condenser 21. Under this condition transistor 27 is in a fully conducting state and acts substantially as a short circuit across condenser 21 resulting in the rapid discharge of that condenser. The circuit then is sensitive to the succeeding negative pulse on input terminal 32.

On the other hand, however, when transistor 10 is conducting, the charging current flowing to condenser 21 causes base 28 of transistor 27 to be at a negative potential with respect to emitter 31, and, this being the condition for cut-off of a NPN type of transistor, transitsor 27 acts as an open circuit across condenser 31, and that condenser may charge freely to provide the mono-stable action.

The circuit will work equally well if transistors 10 and 13 are of the NPN type and transistor 27 of the PNP type, provided the polarity of the operating voltage source and the polarity of the input control signal are reversed.

Thus, it may be seen, that there has been provided a control circuit which will always return to a reference condition in the absence of actuating impulses, but simultaneously may be switched rapidly between positions in the presence of controlling signals. Such a circuit may be incorporated with relative ease in teletypewriting and other equipment requiring such characteristics.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A control circuit including first and second transistors of a first type, each of said transistors having emitter, base and collector electrodes, a series connected combination of a condenser and a resistor having the free terminal of said condenser connected to said base of said first transistor and having the free terminal of said resistor connected to said collector electrode of said second transistor, said collector electrode of said first transistor being cross coupled to said base electrode of said second transistor, said bases and emitters of said first and second transistors being coupled to a common reference potential, said bases of said first and second transistors being connected to first and second input terminals respectively, and said collectors of said first and second transistors being coupled to a source of operating voltage, and a third transistor of a complementary type having base, emitter and collector electrodes, said emitter and collector electrodes of said third transistor being connected across said condenser and said base electrode of said third transistor being coupled to said collector electrode of said second transistor.

2. A control circuit including first and second transistors of the PNP type, each of said transistors having emitter, base and collector electrodes, a series connected combination of a condenser and a resistor having the free terminal of said condenser connected to said base of said first transistor and having the free terminal of said resistor connected to said collector electrode of said second transistor, said collector electrode of said first transistor being cross coupled to said base electrode of said second transistor, said bases and emitters of said first and second transistors being coupled to a common reference potential, said bases of said first and second transistors being connected to first and second input terminals respectively, and said collectors of said first and second transistors being coupled to a source of negative potential, and a third transistor of the NPN type having base, emitter and collector electrodes, said emitter and collector electrodes of said third transistor being connected across said condenser and said base electrode of said third transistor being coupled to said collector electrode of said second transistor.

3. A control circuit including first and second transistors of the NPN type, each of said transistors having emitter, base and collector electrodes, a series connected combination of a condenser and resistor having the free terminal of said condenser connected to said base of said first transistor and having the free terminal of said resistor connected to said collector electrode of said second transistor, said collector electrode of said first transitsor being cross coupled to said base electrode of said second transistor, said bases and emitters of said first and second transistors being coupled to a common reference potential, said bases of said first and second transistors being connected to first and second input terminals respectively, and said collectors of said first and second transistors being coupled to a source of positive potential, and a third transistor of the PNP type having base, emitter and collector electrodes, said emitter and collector electrodes of said third transistor being connected across said condenser and said base electrode of said third transistor being coupled to said collector electrode of said second transistor.

4. A control circuit including first and second transistors of the PNP type, each of said transistors having emitter, base and collector electrodes, a series connected combination of a condenser and a resistor having the free terminal of said condenser connected to said base of said first transistor and having the free terminal of said resistor connected to said collector electrode of said second transistor, said collector electrode of said first transistor being cross coupled to said base electrode of said second transistor, said bases and emitters of said first and second transistors being coupled to a common reference potential, said bases of said first and second transistors being connected to first and second input terminals respectively, and said collectors of said first and second transistors being coupled to a source of negative potential, a discharge device having an emitter electrode, a control electrode and a collector electrode, said control electrode of said discharge device being effective when positive with respect to said emitter electrode of said discharge device to permit current flow between said emitter and collector of said discharge device, said control electrode of said discharge device being coupled to said collector electrode of said second transistor, and said emitter and collector electrodes of said discharge device being connected, respectively, across said condenser.

References Cited in the file of this patent

UNITED STATES PATENTS

| | | |
|---|---|---|
| 2,531,076 | Moore | Nov. 21, 1950 |
| 2,550,116 | Grosdoff | Apr. 24, 1951 |
| 2,562,660 | Chance | July 31, 1951 |
| 2,569,345 | Shea | Sept. 25, 1951 |
| 2,605,306 | Eberhard | July 29, 1952 |
| 2,614,140 | Kreer | Oct. 14, 1952 |
| 2,620,448 | Wallace | Dec. 2, 1952 |
| 2,622,212 | Anderson et al. | Dec. 16, 1952 |
| 2,641,717 | Toth | June 9, 1953 |
| 2,663,800 | Herzog | Dec. 22, 1953 |
| 2,707,752 | Gabler | May 3, 1955 |